United States Patent [19]

Thorp et al.

[11] Patent Number: 5,478,038
[45] Date of Patent: Dec. 26, 1995

[54] RIGHT ANGLE CLAMP

[75] Inventors: Edward J. Thorp, Aurora; William F. Laubach, Elk Grove Village, both of Ill.

[73] Assignee: Pittway Corporation, Chicago, Ill.

[21] Appl. No.: 254,157

[22] Filed: Jun. 6, 1994

[51] Int. Cl.$^6$ .................................................. F16M 13/00
[52] U.S. Cl. .................................. 248/230.9; 248/231.61
[58] Field of Search ............................ 248/200, 225.31, 248/231.1, 228, 230, 231.6, 300, 316.6, 901

[56] References Cited

U.S. PATENT DOCUMENTS

| | | |
|---|---|---|
| 1,113,781 | 10/1914 | Griffin . |
| 1,154,847 | 9/1915 | De Vore . |
| 1,253,402 | 1/1918 | Lovejoy . |
| 1,260,136 | 3/1918 | Brewer . |
| 1,579,290 | 4/1926 | Elder, Jr. . |
| 1,624,289 | 4/1927 | Taylor ........................................ 248/228 |
| 1,755,201 | 4/1930 | Blackburn et al. . |
| 1,793,415 | 2/1931 | Quesenberry . |
| 2,461,256 | 2/1949 | Black .............................. 248/231.6 X |
| 2,676,778 | 4/1954 | Pace et al. . |
| 2,795,859 | 6/1957 | Buschbach .................... 248/231.1 X |
| 2,964,728 | 12/1960 | Wilson . |
| 3,318,561 | 5/1967 | Finke et al. . |
| 3,409,259 | 11/1968 | Cross . |
| 3,559,941 | 2/1971 | Holzman . |
| 3,582,029 | 6/1971 | Moesta . |
| 3,664,624 | 5/1972 | Freegard . |
| 3,711,050 | 1/1973 | Case . |
| 3,970,304 | 7/1976 | Ebstein et al. . |
| 4,079,481 | 3/1978 | Cacicedo . |
| 4,575,063 | 3/1986 | Schlegel et al. . |
| 4,595,165 | 6/1986 | Klingensmith et al. . |
| 4,628,638 | 12/1986 | Elko et al. . |
| 4,909,463 | 3/1990 | Zvanut et al. ................... 248/231.6 X |
| 4,949,929 | 8/1990 | Kesselman et al. . |
| 4,953,716 | 9/1990 | Rapoport . |
| 5,039,039 | 8/1991 | Schaffer . |
| 5,137,249 | 8/1992 | Royster ............................ 248/231.6 X |
| 5,215,281 | 6/1993 | Sherman . |

FOREIGN PATENT DOCUMENTS 639411   4/1962   Canada ............................. 248/231.6

*Primary Examiner*—Ramon O. Ramirez
*Assistant Examiner*—Derek J. Berger
*Attorney, Agent, or Firm*—Dressler, Goldsmith, Shore & Milnamow, Ltd.

[57] ABSTRACT

A right angle clamp is usable for mounting a condition sensor to an apparatus, such as a valve and the like. The clamp includes a bracket having first and second sides. The first side has a pair of elongated slots therein for receipt of a pair of straight-bolts. The bolts pass through the yoke of an associated valve, between the yoke uprights and the valve stem, and are secured to a substantially U-shaped, elongated retaining member having an open end. Each bolt is secured to the retaining member by threaded nut. A substantially U-shaped reinforcing member is positioned between the retaining member and the nut to prevent distortion of the retaining member when the retaining member is in tension. The elongated retaining member allows for easy installation and adjustment of the clamp.

12 Claims, 2 Drawing Sheets

RIGHT ANGLE CLAMP

FIELD OF THE INVENTION

This invention pertains to right angle clamps, and more particularly to right angle clamps for securing a condition sensor to an associated apparatus, such as a valve and the like.

BACKGROUND OF THE INVENTION

Condition sensors or sensing devices are mounted to many different types of apparatuses, such as valves, to sense the condition, (i.e., open or closed) of the apparatus. Such sensors can be mounted to an apparatus in many different ways.

Foremost in the configuration of such mounting devices is that the devices must be relatively inexpensive, reliable, easy to install, and readily adjustable. Importantly, such mounting devices must be designed to facilitate maintenance of the sensor and the apparatus to which the sensor is mounted. Moreover, such sensor mounting devices are best designed with flexibility in mind, that is, that such mounting devices can be "universally" adaptable for use with various sensors and various apparatuses.

One such application of mounting a condition sensor to an apparatus, namely mounting a valve position sensor to a gate valve, requires that the mounting device support a position sensor. The sensor is clamped to the valve yoke such that the sensor element can be moved, without obstruction, between the open and closed indicating positions by movement of the valve stem.

Known mounting devices include a bracket to which the sensor is mounted. The bracket further includes a pair of apertures through which bolts extend for mounting the bracket to the valve yoke.

In one such mounting arrangement, J-bolts are used to secure the bracket to the valve. In such an arrangement, the valve yoke is positioned between the J-shaped portion of the bolt and the bracket. Threaded nuts are then used to tension the J-bolt and secure the bracket to the valve yoke.

In another mounting arrangement, the bracket is secured to the valve yoke by straight-bolts. The bolts are secured by flat washers and threaded nuts to a continuous steel loop positioned on the opposite side of the valve yoke.

Problems have been observed with both of the prior mounting arrangements. The J-bolt arrangement does not provide the flexibility necessary for "universally" mounting to a variety of valves.

One known mounting arrangement utilizes flat washers and a continuous loop. Such mounting devices proved to be difficult to install in that considerable in-field assembly was required. This can be particularly time consuming where the valve or other apparatus is located in cramped or environmentally harsh areas.

There continues to be a need for brackets that are readily mountable onto valves even in the most difficult locations. Preferably, a variety of electrical units or detectors could be mounted on such a bracket.

SUMMARY OF THE INVENTION

A right-angle clamp is provided which is mountable onto an apparatus, such as a valve. The clamp has a bracket which defines first and second openings therethrough. First and second straight bolts extend through the respective openings.

The clamp further includes a substantially U-shaped, elongated retaining member having a central opening. Portions of the bolts, located distally of the bracket, can be positioned in the opening with the apparatus locatable between the bracket and the retaining member. Elements, such as threaded nuts, are carried on the bolts for placing portions of the bolts between the bracket and the retaining member under tension when the apparatus is located therebetween thereby affixing the clamp to the apparatus.

The clamp may also include at least one substantially U-shaped reinforcing member positionable on at least one of the bolts adjacent to and so as to prevent the retaining member from becoming distorted when the bolts are under tension. Preferably, the reinforcing member is positioned between the retaining member and a respective one of the elements.

The openings in the bracket through which the straight bolts extend may be elongated. The bracket may also include one or more openings for mounting a condition sensor thereon. In a preferred embodiment, the bracket has at least first and second sides which are oriented substantially perpendicular to one another.

The clamp of the present invention may be used to mount an operative unit thereon. Examples of such operative units include condition sensors, such as position indicators and the like.

These and other aspects and attributes of the present invention will be discussed with reference to the following drawings and accompanying specification.

DETAILED DESCRIPTION OF THE PREFERRED EMBODIMENT

Figure 1:
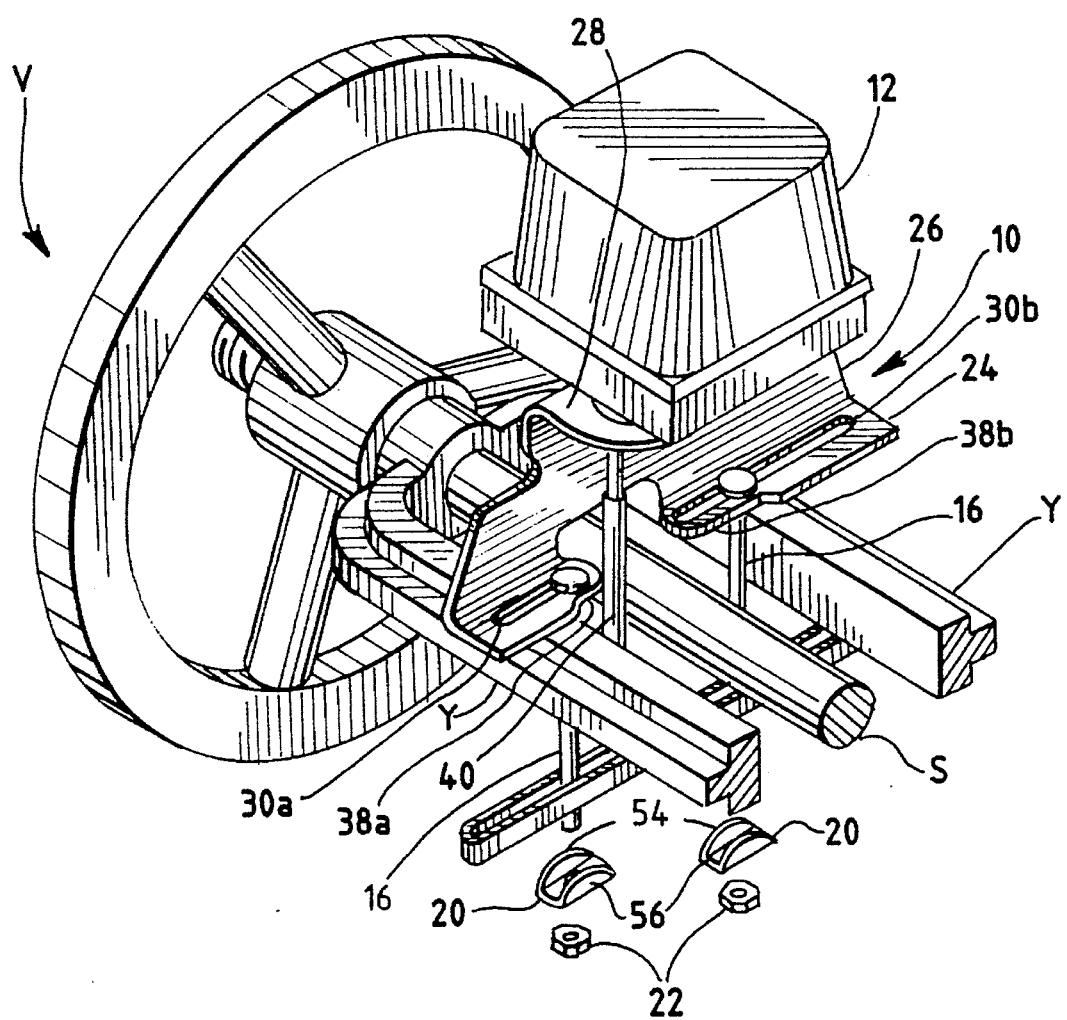
FIG. 1 is a perspective view of a right angle clamp which embodies the principles of the present invention, having a sensor mounted thereon, the clamp being mounted to the yoke of an associated valve.

While this invention is susceptible of embodiment in many different forms, there is shown in the drawings and will be described herein in detail, a specific embodiment thereof with the understanding that the present disclosure is to be considered an exemplification of the principles of the invention and is not intended to limit the invention to the specific embodiment illustrated.

With reference now to FIG. 1, there is shown a right angle clamp 10, of the present invention, having mounted thereon a condition sensor 12. The clamp 10 is mounted to the yoke Y of an associated valve V.

The clamp 10 includes a bracket 14, a pair of straight bolts 16, a U-shaped, elongated retaining member 18, a pair of substantially U-shaped reinforcing members 20, and a pair of threaded nuts 22.

The bracket 14 has a first side 24 which rests against the yoke Y of the valve V. Extending generally perpendicular to the first side 24, the bracket 14 has a second side 26. A flange portion 28 extends generally perpendicular from the second side 26, opposite first side 24.

Figure 2:
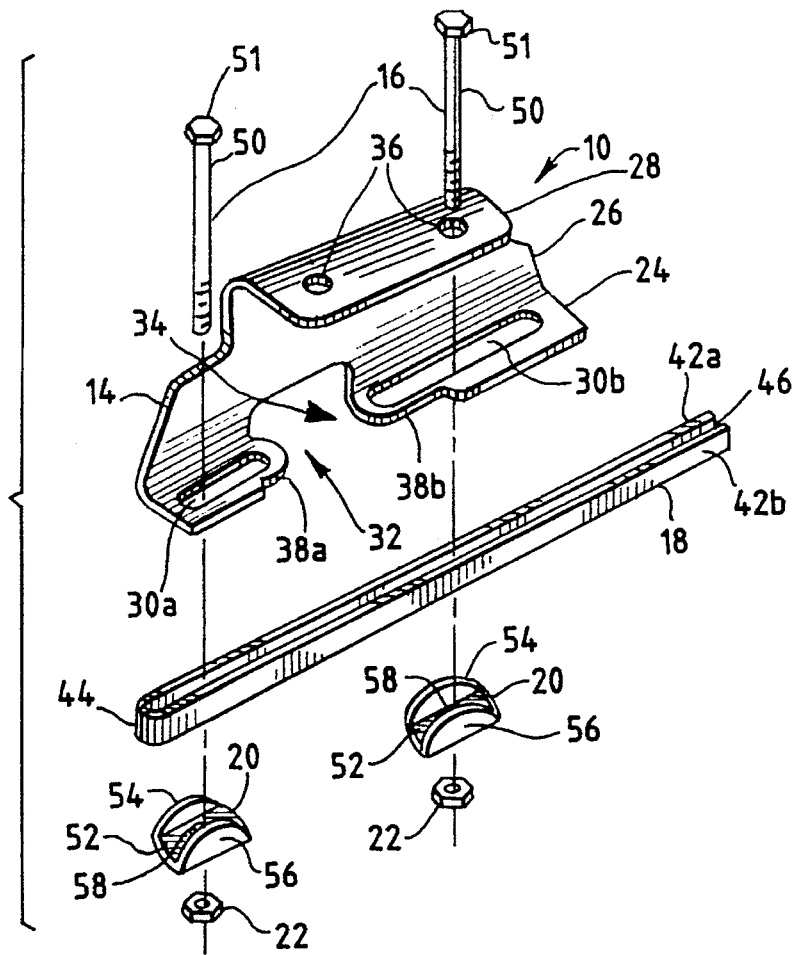
FIG. 2 is an exploded perspective view of the right angle clamp of FIG. 1.

As best shown in FIG. 2, the bracket first side 24 has a pair of elongated openings or slots 30a, 30b, through which straight bolts 16 extend. First side 24 also has an opening 32 therein which is contiguous with an opening 34 extending into the second side 26 at about the juncture thereof. Referring to FIG. 1, openings 32, 34, facilitate placement of the clamp 10 on the valve yoke Y so that the valve stem S can move freely therethrough.

As shown in FIG. 2, the flange portion 28 has a pair of apertures 36 which may be formed as circular openings as shown, or which may be formed in an elongated shape. Apertures 36 facilitate mounting of the condition sensor 12 to the clamp 10. In a preferred embodiment, first side 24 also includes a pair of notches 38a, 38b. The notches 38a, 38b, are formed generally parallel to elongated slots 30a, 30b. The notches 38a, 38b, permit unrestricted movement of a sensor element 40 between the sensed conditions (i.e., open and closed) of the valve V.

Clamp 10 also includes a generally U-shaped elongated retaining member 18. Retaining member 18 includes a pair of substantially parallel side walls 42a, 42b, connected by a closed end 44. Retaining member 18 has an open end 46 opposite the closed end 44. Retaining member 18 may be formed from bent bar-stock or the like. The parallel side walls 42a, 42b, are separated by a predetermined gap, shown at 48, the gap being slightly larger than the diameter of the shank 50 of the straight bolt 16.

Figure 3:
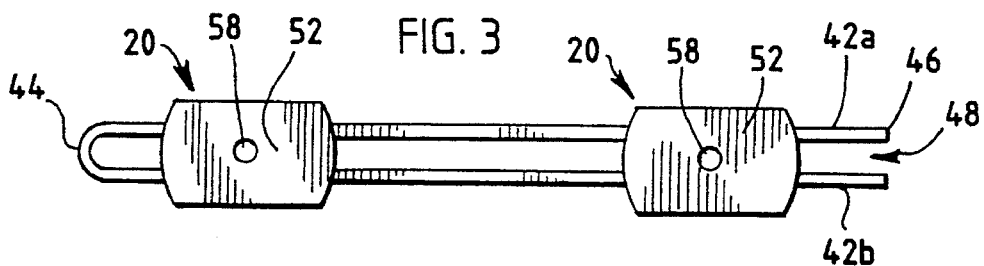
FIG. 3 is a plan view showing the elongated retaining member and the pair of U-shaped reinforcing members positioned thereon.
Figure 4:
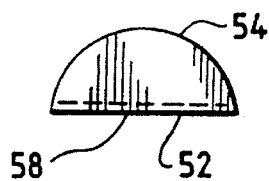
FIG. 4 is a front elevational view of one of the U-shaped reinforcing members shown in FIG.3.
Figure 5:
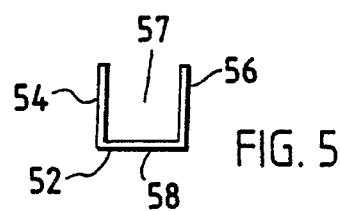
FIG. 5 is a side elevational view of the reinforcing member shown in FIG. 4.

Clamp 10 also includes a pair of substantially U-shaped reinforcing members 20, which are best seen in FIGS. 3 through 5. Reinforcing member 20 has a base portion 52 and first and second upright sides 54, 56 which extend generally perpendicular to base 52.

Upright sides 54, 56, form a channel 57 in reinforcing member 20. The channel 57 has a width slightly larger than the width of the retaining member 18, such that the reinforcing member 20 overlaps the retaining member 18 when member 18 is positioned within the channel 57. Base portion 52 has an aperture 58 extending therethrough for receipt of a straight bolt 16. In a preferred embodiment, the reinforcing member 20 is formed from a generally circular piece of steel or the like with the upright sides 54, 56, being formed by bending or similar method.

Clamp 10 also includes a pair of threaded nuts 22 for threadedly engaging straight bolts 16.

In use, an operative unit, such as the exemplary condition sensor 12 is first mounted to the bracket 14. The sensor 12 can be mounted by using bolts (not shown) inserted through apertures 36 and secured accordingly. Alternatively, it may be desirable to mount the sensor 12 to the clamp 10 after the clamp 10 is installed on the associated valve V.

Straight bolts 16 are then inserted through the elongated slots 30a, 30b, and inserted through the apertures 58 in the reinforcing members 20. Threaded nuts 22 are then threadedly engaged on the threaded end of the straight bolts 16. This first step of the installation procedure may be performed prior to installing the clamp 10 on the valve.

Referring now to FIG. 1, the partially assembled clamp 10 including the sensor 12 is then placed on the valve V such that the first side 24 of the clamp 10 rests across the yoke Y. The clamp 10 is positioned such that each straight bolt 16 passes through the valve yoke Y between a respective upright portion of the yoke Y and the valve stem S.

The retaining member 18 is then positioned in clamp 10 by passing open end 46 over the straight bolts 16 between retaining members 20 and yoke Y. Threaded nuts 22 are then threaded to the bolts 16 to secure the clamp 10 in place. Importantly, the retaining member 18 must be positioned within the channel 57 of each reinforcing member 20. Because the height of the retaining member 18 is greater than the height of the upright sides 54, 56, when the bolts 16 are tensioned, the retaining member 18, and not the reinforcing members 20, contact the yoke Y.

The clamp 10 is easily adjusted on the valve V by loosening nuts 22 and moving the clamp 10 axially and longitudinally along the yoke Y.

The precise construction and dimensions of valves differ among valve manufacturers. Nevertheless, most rising stem valves will have an indent or plate located on valve stem S in order to indicate valve position or to selectively move a position indicating element between an open and a closed position of the valve.

In order to properly function with such an indent or plate, the position indicator must be adjusted accordingly such that the indicator represents the open and closed positions of such a valve. The present invention allows just such adjustment with minimal effort.

As provided above, nuts 22 are loosened and the clamp 10 can be moved axially and longitudinally along the yoke Y to properly position a sensing element 40 relative to the stem S indent or plate. The nuts 22 are then tightened to secure the clamp 10 on the valve yoke Y in the final adjusted position.

The present invention also overcomes the prior problems of bending or distorting of the continuous steel loop member arrangement. The upright sides 54, 56, of the reinforcing members 20 prevent distortion of the retaining member 18 during tensioning of the straight bolts 16, by maintaining the side walls 42a, 42b, in parallel relation.

Upright sides 54, 56, also prevent the side walls 42a, 42b, from spreading outwardly during tensioning. Such an arrangement mitigates the consequences of overtensioning the bolts 16, and reduces or eliminates the possible adverse effects that distortion may have on the integrity of the clamp 10.

It will be readily recognized by those skilled in the art that the clamp 10 of the present invention can be provided as described, as a part which is separate from the condition sensor. Alternatively, the clamp 10 may be provided integral with such a sensor.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A clamp mountable onto an apparatus comprising:

a bracket which defines first and second openings therethrough;

first and second straight bolts which extend through respective of said openings;

a substantially U-shaped, elongated retaining member having an open end and a central opening wherein portions of said bolts, located distally of said bracket, can be positioned therein with the apparatus locatable between said bracket and said retaining member; and elements carried on said bolts for placing portions of said bolts between said bracket and said retaining member under tension when the apparatus is located therebetween thereby affixing the clamp thereto.

2. A clamp as in claim 1 wherein said openings in said bracket are elongated.

3. A clamp as in claim 1 wherein said bracket included one or more openings for mounting a condition sensor thereon.

4. A clamp as in claim 1 wherein said bracket has at least first and second sides oriented substantially perpendicular to one another.

5. A clamp as in claim 4 which includes a condition sensor affixed to one of said sides.

6. A clamp as in claim 1 which further includes an operative unit mounted thereon.

7. A clamp mountable onto an apparatus comprising:

a bracket which defines first and second openings therethrough;

first and second straight bolts which extend through respective of said openings;

a substantially U-shaped, elongated retaining member with a central opening wherein portions of said bolts, located distally of said bracket, can be positioned therein with the apparatus locatable between said bracket and said retaining member;

elements carried on said bolts for placing portions of said bolts between said bracket and said retaining member under tension when the apparatus is located therebetween thereby affixing the clamp thereto; and at least one substantially U-shaped reinforcing member positionable on at least one of said bolts adjacent to and so as to prevent said retaining member from becoming distorted when said bolts are under tension.

8. A clamp as in claim 7 wherein said reinforcing member is positioned between said retaining member and a respective one of said elements.

9. A clamp mountable onto an apparatus comprising:

a bracket having first and second sides, wherein said sides are oriented substantially perpendicular to one another, the first side defining first and second elongated openings therethrough;

first and second straight bolts which extend through respective of said openings;

a substantially U-shaped, elongated retaining member with a central opening wherein portions of said bolts, located distally of said bracket, can be positioned therein with the apparatus locatable between said bracket and said retaining member;

at least one substantially U-shaped reinforcing member positionable on at least one of said bolts adjacent to and so as to prevent said retaining member from becoming distorted when said bolts are under tension; and elements carried on said bolts for placing portions of said bolts between said bracket and said retaining member under tension when the apparatus is located therebetween thereby affixing the clamp thereto, wherein said reinforcing member is positioned between said retaining member and a respective one of said elements.

10. A clamp as in claim 9 which includes a flange portion extending generally perpendicular to said second side.

11. A sensor couplable to an apparatus comprising:

a detector of a parameter of the apparatus;

a right angle bracket with said detector coupled thereto wherein said bracket defines at least first and second spaced apart openings;

first and second bolts extending through respective of said openings and positionable adjacent to the apparatus;

an elongated member positionable adjacent to the apparatus and spaced apart from said bracket, wherein said member defines an elongated opening therein with said bolts extending therethrough; and one or more U-shaped reinforcing elements carried on a respective one of said bolts and overlapping said elongated member to prevent distortion thereof when said bolts are under tension.

12. A sensor as in claim 11 which includes one or more elements carried on respective ones of said bolts, adjacent to respective of said one or more reinforcing elements so as to place said bolts under tension.

* * * * *